J. N. DUNCAN.
AUTOMOBILE SUPPORT.
APPLICATION FILED MAY 14, 1919.

1,340,438.

Patented May 18, 1920.

INVENTOR
James N. Duncan
By His Attorney
Emerson R. Newell

UNITED STATES PATENT OFFICE.

JAMES N. DUNCAN, OF DETROIT, MICHIGAN, ASSIGNOR TO DODGE BROTHERS, OF DETROIT, MICHIGAN, A CORPORATION OF MICHIGAN.

AUTOMOBILE-SUPPORT.

1,340,438.  Specification of Letters Patent.  Patented May 18, 1920.

Application filed May 14, 1919. Serial No. 296,994.

*To all whom it may concern:*

Be it known that I, JAMES N. DUNCAN, a citizen of the United States, residing at Detroit, Michigan, have invented certain new and useful Improvements in Automobile-Supports, of which the following is a clear, full, and exact description.

This invention relates to improvements in means for supporting automobiles in freight cars during shipment and has for an object the provision of a crating structure, whereby a greater number of automobiles may be packed into one car than has been possible by means heretofore used, the packing arrangement being such that the automobiles need not be completely disassembled, and that a great amount of time and labor need not be expended in storing them in the cars.

Another object of the invention is the provision of a structure which is sufficiently strong to resist the shocks and rough treatment to which articles shipped in freight cars are subjected, but which is, nevertheless, simple to construct and requires but few pieces of timber.

Other objects and important features of the invention will be apparent from the following description and claims when taken in connection with the accompanying drawings, in which—

Figure 1:
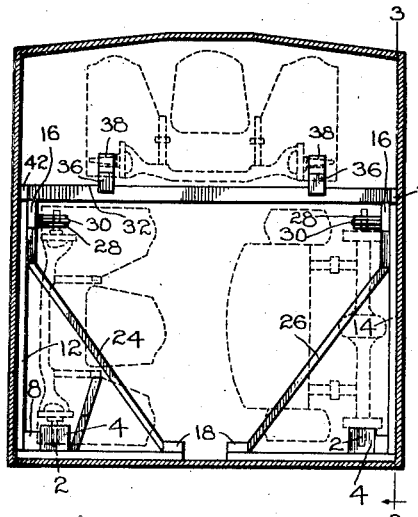

Figure 1, is a transverse section of a freight car showing my improved structure arranged to support three automobiles.

Figure 2:
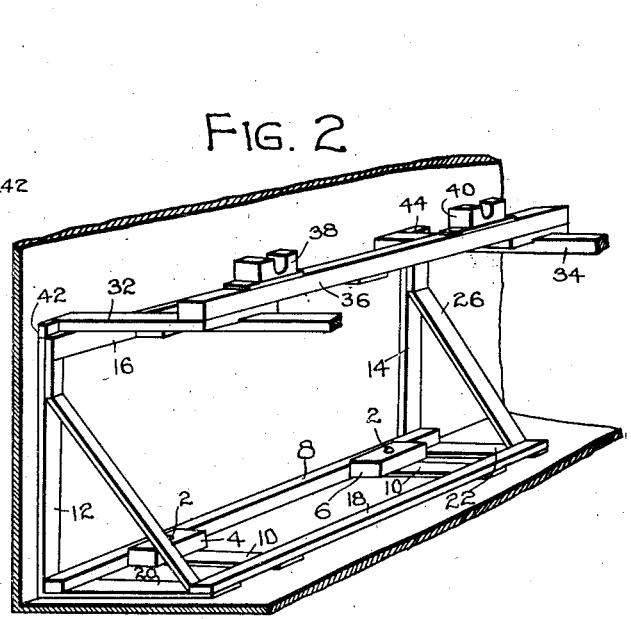
Figure 3:
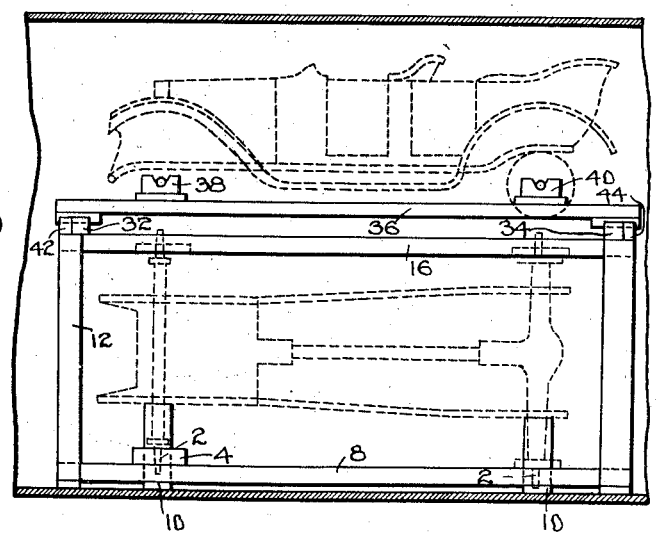

Fig. 2, a perspective view of the supporting structure looking toward the left side as viewed in Fig. 1, and Fig. 3, a side elevational view partly in section.

As shown in the drawings, automobiles packed in the manner set forth in this invention may be practically complete, the only parts of importance which have to be removed being the wheels and wind shield. It will further be observed that all of the automobiles are supported principally by their axles and by reason of the fact that two of the automobiles are supported on their sides there is still room in an ordinary freight car for a third automobile to be supported in upright position near the top of the car. By this method of loading, at least nine automobiles may be shipped in a forty foot freight car which is in excess of the number obtained by any other system of packing which has heretofore been used, in so far as I am aware.

The lower front and rear axle spindles 2 of each of the two lower automobiles are supported in blocks 4 and 6, each block being suitably bored to receive its spindle. These blocks are securely fastened to a longitudinal corner timber 8. Also secured to each timber 8 near each end thereof, are members 10, upon which the blocks 4 and 6 rest when the supporting structure is in position within the car. Also connected to each longitudinal timber 8, as shown clearly in Fig. 2, are vertical members 12 and 14, member 12 being situated at the front of the frame work, while the member 14 is situated at the rear thereof. Connecting the two members 12 and 14 is a longitudinal member 16. The members 12, 14 and 16, together with the longitudinal timber 8 constitute the vertical panel. A horizontal panel is formed by the longitudinal timber 8, and the two members 10 together with a front end member 20 and a rear end member 22, each fastened to the timber 8 and connected at their outer ends by a longitudinal member 18. Inclined braces 24 and 26 extend from each member 18 to blocks arranged under the members 16 said braces serving to support the members 16 and also acting to maintain the vertical and horizontal panels perpendicular to each other, each panel forming a rigid rectangular frame, the two panels at each side of the car forming angles within which each of the two lower automobiles are supported and protected. Connected to the longitudinal member 16 at the front and rear thereof is a block 28 secured to the member 16 by a yoke 30. These blocks 28 support the upper ends of the axles of the two lower automobiles. The frame work on either side of the car to support the automobiles on their sides, is substantially similar, and the right angles formed by the two pairs of panels may face each other as indicated in Fig. 1.

In applying the framework to an automobile, it is convenient to place the automobile in its normal position, but with its wheels removed, upon the frame formed by the members 8, 12, 14, 16, 10 and 18 and then to apply the blocks for securing the axles, and finally to turn the complete structure over on its side as shown in the drawings.

In this position each complete unit or crate is brought into the car and placed as indicated in Fig. 1. These crates may be, and preferably are, constructed as described in my Patent No. 1,290,818, dated Jan. 7, 1919.

A third automobile is supported in upright position by a framework formed as follows, which is built upon the lower units or crates.

To support such third automobile, transverse members 32 and 34 are provided, each resting upon and secured to members 16 which form the top longitudinal members of the vertical panels. Resting upon and secured to the members 32 and 34 are longitudinal members 36 having the blocks 38 and 40 secured thereto, said blocks having notches therein into which the axles of a third automobile rest and are supported rigidly by the frame work described.

As an additional safeguard against any possibility of the frame work shifting longitudinally in the car during the jars and shocks to which the car may be subjected, blocks 42 and 44 may be provided, which blocks are situated above the vertical members 12 and 14 respectively and in front and behind the members 32 and 34 respectively. These blocks are nailed or otherwise firmly secured to the sides of the car.

Having described my invention, what I claim and desire to secure by Letters Patent is—

1. A shipping structure for automobiles having, in combination, means for supporting two automobiles standing on their sides and means also connected to said first mentioned means for supporting a third automobile in upright position.

2. A shipping structure for automobiles having, in combination, two panels, means connected to each panel for supporting an automobile on its side and means connected to both panels for supporting a third automobile in upright position.

3. A shipping structure for automobiles having, in combination, a vertical panel, a horizontal panel at right-angles thereto, a second horizontal and a second vertical panel also arranged at right-angles with respect to each other, means for supporting an automobile on its side within the angle formed by each pair of panels and means connected to the vertical panels for supporting a third automobile in upright position.

4. A shipping structure for automobiles having, in combination, a vertical panel, a horizontal panel at right-angles thereto, a second horizontal and a second vertical panel also arranged at right-angles with respect to each other, the angles formed by one pair of panels facing the angle formed by the other pair of panels, means for supporting an automobile on its side within the angle formed by each pair of panels, and means connected to the vertical panels for supporting a third automobile in upright position.

5. A shipping structure for automobiles having, in combination, means for supporting automobiles in freight cars comprising vertical panels, one panel arranged on each side of the car, means in connection with each vertical panel for supporting an automobile on its side and means in connection with both vertical panels for supporting an automobile in upright position.

6. A frame-work for supporting automobiles during shipment, consisting of a pair of panels each in a vertical plane and a pair of panels in a horizontal plane, inclined braces, one for connecting each vertical panel to a horizontal panel, means connected to each vertical panel for retaining the axles of an automobile, and means connected to both vertical panels for retaining the axles of a third automobile.

7. A shipping structure for automobiles having, in combination, means for supporting automobiles in freight cars comprising vertical panels, one panel arranged on each side of the car, means in connection with each vertical panel for supporting an automobile, an inclined brace for each vertical panel to hold it in vertical position, and means in connection with both vertical panels and supported by said braces for supporting a third automobile.

8. A shipping structure for automobiles having, in combination, means for supporting automobiles in freight cars during shipment, consisting of a pair of panels each in a vertical plane and a pair of panels in a horizontal plane, inclined braces, one connecting each vertical panel to a horizontal panel, means connected to each vertical panel for retaining an automobile, and means supported by said braces and connecting both vertical panels for retaining a third automobile.

9. A shipping structure for automobiles having, in combination, means for supporting two automobiles in opposed relation on their sides, and means for supporting a third automobile in upright position.

10. The method of loading automobiles in freight cars, which consists in forming crates each supporting an automobile, turning each of said crates so that the automobile contained therein is supported on its side, placing two of said crates in this position side by side in the car, and forming a supporting structure for a third automobile on said crates as a base, said third automobile being supported in upright position.

11. The method of loading automobiles in freight cars, which consists in forming crates each supporting an automobile, turning each of said crates so that the automobile contained therein is supported on its side, placing two of said crates in this position side by side in the car and placing a third automobile in upright position above said crates.

Signed at Detroit, Michigan, this 7th day of May, 1919.

JAMES N. DUNCAN.

Witnesses:
 MARGARET R. HARBISON,
 ALFRED H. KNIGHT.